United States Patent
Kwon et al.

(10) Patent No.: US 11,646,962 B1
(45) Date of Patent: May 9, 2023

(54) ZERO OVERHEAD EFFICIENT FLOODING (ZOEF) ORIENTED HYBRID ANY-CAST ROUTING FOR MOBILE AD HOC NETWORKS (MANET)

(71) Applicant: Rockwell Collins, Inc., Cedar Rapids, IA (US)

(72) Inventors: T j T. Kwon, Marion, IA (US); Robert W. Hartney, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 162 days.

(21) Appl. No.: 17/079,315

(22) Filed: Oct. 23, 2020

(51) Int. Cl.
*H04W 40/24* (2009.01)
*H04L 45/00* (2022.01)
*H04W 84/18* (2009.01)

(52) U.S. Cl.
CPC ........... *H04L 45/32* (2013.01); *H04W 40/246* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 4,399,531 | A | 8/1983 | Grande et al. |
| 5,835,482 | A | 11/1998 | Allen |
| 6,845,091 | B2 | 1/2005 | Ogier et al. |
| 7,242,671 | B2 | 7/2007 | Li et al. |
| 7,573,835 | B2 | 8/2009 | Sahinoglu et al. |
| 7,656,851 | B1 | 2/2010 | Ghanadan et al. |
| 7,698,463 | B2 | 4/2010 | Ogier et al. |
| 7,719,989 | B2 | 5/2010 | Yau |

(Continued)

FOREIGN PATENT DOCUMENTS

| | | |
|---|---|---|
| CN | 101330448 B | 12/2010 |
| CN | 101465793 B | 2/2011 |

(Continued)

OTHER PUBLICATIONS

Sun et al., A Delay-Aware Clustering Protocol for Wireless Ad Hoc Networks, Apr. 2005, University of California, pp. 1-8. (Year: 2005).*

*Primary Examiner* — Nicholas Sloms
(74) *Attorney, Agent, or Firm* — Suiter Swantz pc llo

(57) ABSTRACT

A system and method for hybrid any-cast (unicast, multicast and anycast) routing in a mobile ad hoc communication network (MANET) is disclosed. In embodiments, each communication node of the MANET may implement on-demand routing functions whereby the node does not establish or maintain routes to destination nodes unless there is active communication, discovering routes via flooding of data packets in transit. Each communication node may select, or may transition from on-demand to, proactive routing functions. Proactive nodes first establish routes to clusters of other proactive nodes by flooding, and receiving acknowledgments from, the other proactive nodes. Each cluster of proactive nodes maintains routes within the cluster and establishes communication routes outside the cluster by flooding and relaying of routing status messages via clusterhead and gateway nodes. A single MANET can support clusters of proactive nodes within a network of on-demand nodes and dynamic transitions between proactive and on-demand status.

14 Claims, 10 Drawing Sheets

(56) References Cited

U.S. PATENT DOCUMENTS

| | | |
|---|---|---|
| 7,787,450 B1 | 8/2010 | Chan et al. |
| 7,848,278 B2 | 12/2010 | Chen et al. |
| 7,978,672 B2 | 7/2011 | Draves, Jr. et al. |
| 8,036,224 B2 | 10/2011 | Axelsson et al. |
| 8,218,550 B2 | 7/2012 | Axelsson et al. |
| 8,223,660 B2 | 7/2012 | Allan et al. |
| 8,490,175 B2 | 7/2013 | Barton et al. |
| 8,520,673 B2 | 8/2013 | Chen et al. |
| 8,553,560 B2 | 10/2013 | Axelsson et al. |
| 8,630,291 B2 | 1/2014 | Shaffer et al. |
| 8,675,672 B1 * | 3/2014 | Bao ............ H04L 45/46 370/408 |
| 8,717,935 B2 | 5/2014 | Lindem, III et al. |
| 8,942,197 B2 | 1/2015 | Rudnick et al. |
| 8,982,708 B1 * | 3/2015 | McCabe ............ H04W 40/24 370/216 |
| 9,179,475 B2 | 11/2015 | Koleszar et al. |
| 9,246,795 B2 | 1/2016 | Madaiah et al. |
| 9,247,482 B2 | 1/2016 | Sherman et al. |
| 9,544,162 B2 | 1/2017 | Vasseur et al. |
| 9,615,284 B2 | 4/2017 | Ghanadan et al. |
| 10,097,469 B2 | 10/2018 | Hui et al. |
| 10,205,654 B2 | 2/2019 | Choi et al. |
| 10,484,837 B2 | 11/2019 | Navalekar et al. |
| 10,873,429 B1 | 12/2020 | Kwon et al. |
| 2002/0018448 A1 * | 2/2002 | Amis ............ H04L 41/0893 370/255 |
| 2003/0123419 A1 * | 7/2003 | Rangnekar ............ H04L 45/02 370/349 |
| 2004/0246902 A1 | 12/2004 | Weinstein et al. |
| 2005/0030921 A1 * | 2/2005 | Yau ............ H04L 45/00 370/349 |
| 2005/0053007 A1 | 3/2005 | Bernhardt et al. |
| 2006/0010170 A1 | 1/2006 | Lashley et al. |
| 2006/0285529 A1 * | 12/2006 | Hares ............ H04W 40/26 370/400 |
| 2007/0097880 A1 * | 5/2007 | Rajsic ............ H04L 45/02 370/254 |
| 2007/0299950 A1 * | 12/2007 | Kulkarni ............ H04L 45/46 709/249 |
| 2008/0107034 A1 | 5/2008 | Jetcheva et al. |
| 2008/0205332 A1 | 8/2008 | Kim |
| 2010/0074101 A1 | 3/2010 | Skalecki et al. |
| 2011/0188378 A1 | 8/2011 | Collins et al. |
| 2013/0145461 A1 * | 6/2013 | Barton ............ H04W 12/12 726/22 |
| 2013/0250808 A1 | 9/2013 | Hui et al. |
| 2013/0315099 A1 | 11/2013 | Chen et al. |
| 2015/0222479 A1 | 8/2015 | Kim et al. |
| 2016/0150465 A1 * | 5/2016 | Jung ............ H04W 52/0209 370/254 |
| 2016/0373997 A1 | 12/2016 | Petersen et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0146489 A1 | 5/2018 | Jin et al. |
| 2018/0302807 A1 | 10/2018 | Chen et al. |
| 2019/0098625 A1 | 3/2019 | Johnson et al. |
| 2019/0285722 A1 | 9/2019 | Markhovsky et al. |
| 2020/0052997 A1 | 2/2020 | Ramanathan et al. |
| 2020/0092949 A1 | 3/2020 | Donepudi et al. |
| 2020/0236607 A1 | 7/2020 | Zhu et al. |
| 2021/0243671 A1 * | 8/2021 | Paillet ............ H04W 40/246 |

FOREIGN PATENT DOCUMENTS

| | | |
|---|---|---|
| CN | 101686179 B | 1/2013 |
| CN | 103067286 B | 6/2016 |
| CN | 107645417 A | 1/2018 |
| EP | 1912392 A2 | 4/2008 |
| EP | 2743726 A1 | 6/2014 |
| GB | 2493133 A8 | 1/2013 |
| KR | 1020040107702 A | 12/2004 |
| KR | 1020060078814 A | 7/2006 |
| WO | 2006124938 A2 | 11/2006 |
| WO | 2007040901 A3 | 6/2007 |
| WO | 2012062091 A1 | 5/2012 |
| WO | 2012165938 A1 | 12/2012 |
| WO | 2017101575 A1 | 6/2017 |
| WO | 2019045767 A1 | 3/2019 |

* cited by examiner

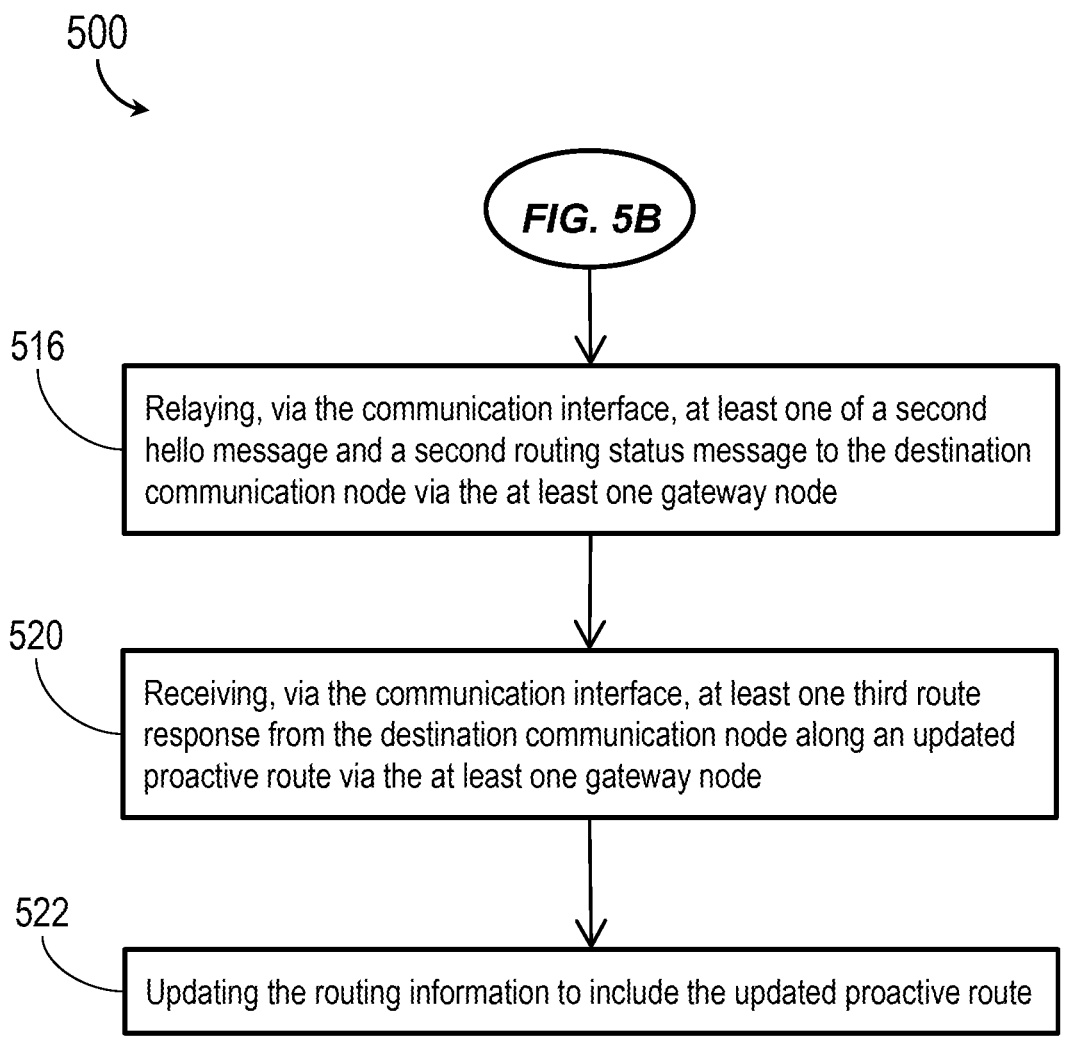

ZERO OVERHEAD EFFICIENT FLOODING (ZOEF) ORIENTED HYBRID ANY-CAST ROUTING FOR MOBILE AD HOC NETWORKS (MANET)

CROSS-REFERENCE TO RELATED APPLICATIONS

This application is related to, and incorporates by reference in its entirety, the following U.S. patent applications: Ser. No. 16/698,230 filed Nov. 27, 2019 and entitled SYSTEM AND METHOD FOR ADAPTIVE POSITION-LOCATION INFORMATION EXCHANGES, which application issued May 4, 2021 as U.S. Pat. No. 10,999,078; Ser. No. 16/369,398 filed Mar. 29, 2019 and entitled ZERO-OVERHEAD EFFICIENT FLOODING, which application issued Apr. 13, 2021 as U.S. Pat. No. 10,979,348; Ser. No. 16/537,824 filed Aug. 12, 2019 and entitled FLOODING TO ROUTING, which application issued Feb. 23, 2021 as U.S. Pat. No. 10,931,570; Ser. No. 16/707,111 filed Dec. 9, 2019 and entitled RELIABLE EFFICIENT FLOODING IN MANET, which application issued Mar. 22, 2022 as U.S. Pat. No. 11,284,295; and Ser. No. 16/987,671 filed Aug. 7, 2020 and entitled SYSTEM AND METHOD FOR INDEPENDENT DOMINATING SET (IDS) BASED ROUTING IN MOBILE AD HOC NETWORKS (MANET), which application issued Mar. 29, 2022 as U.S. Pat. No. 11,290,942.

BACKGROUND

Mobile ad-hoc communication networks (MANETs are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Generally speaking, the individual nodes of a MANET can establish communication routes between each other on a proactive or reactive (e.g., on-demand) basis. For example, on-demand routing provides that routes are not established unless and until active communications are detected, at which point routes between particular source and destination nodes may be added via a variety of packet flooding schemes. There are several types of flooding including blind flooding, efficient flooding with multi-point relay (MPR), and efficient flooding with passive clustering (EFPC), and like. However, on-demand routing is generally associated with initial route setup delays, as routes are not established until they are needed, and each flooding scheme suffers from particular drawbacks. For example, blind flooding inevitably results in unnecessary broadcasting, which results in rapidly increasing costs as the network density increases. Similarly, multipoint relay (MPR) results in increasing gain and overhead as the network density increases. Proactive routing provides for initial establishment and maintenance of routes, e.g., via clusters of clusterhead and gateway nodes for flooding initiation and relay. However, the complete set of routing information can be slow to establish and maintain.

Concepts of operations (CONOPS) may provide for the number of nodes within a given MANET as well as the proximity, mobility, power requirements, network requirements and timing requirements of each individual node. As CONOPS and mission requirements continue to evolve, it may be desirable to provide both on-demand and proactive capabilities without limiting networking architecture. However, conventional attempts to blend proactive and on-demand routing have resulted in route setup delays similar to those associated with conventional on-demand routing.

SUMMARY

A communication node of a multi-node communication network configured for hybrid any-cast (unicast, multicast, and anycast) routing is disclosed. In embodiments, the node includes a communication interface and controller. The node receives data packets in transit between a source node and a destination node and operates via either opportunistic on-demand routing functions (e.g., flooding to routing (F2R)) or proactive routing functions (e.g., independent dominating set (IDS) based routing), the node configured for both sets of functions. As a proactive node, the node identifies a cluster of additional proactive nodes via transmission and flooding of hello messages including an identifier and clustering status (e.g., clusterhead, gateway, ordinary) of the node. The proactive node adjusts its node identifier to include a group identifier for all nodes within the proactive cluster. The proactive node receives acknowledgements from the other proactive nodes and retransmits the hello messages with the updated acknowledgement list until no more acknowledgements are received and the cluster of proactive nodes is identified. As an opportunistic on-demand node, the node transmits the received packet (or a portion thereof) according to packet flooding or route flooding procedures. The on-demand node receives route responses sent back to the source node of the data packet from the destination node, the route responses indicative of a discovered route between the source and destination nodes. The on-demand node updates its own local routing information to include the discovered route.

In some embodiments, the node is a clusterhead node of a proactive cluster including one or more gateway nodes. The clusterhead node may discover or maintain proactive routes to destination nodes by relaying routing status messages. The clusterhead node receives (e.g., relayed by the gateway nodes) route responses from the destination node, the route response indicative of a discovered proactive route to the destination node, and updates its own local routing information to include the proactive route. The proactive route transmits the received data packet to the destination node via the discovered proactive route.

In some embodiments, the hello messages transmitted by the proactive node are adaptive hello messages not include a complete local neighbor list.

In some embodiments, the routing status messages relayed by the proactive node include link status advertisements (LSA) and/or distance vector distributions (DVD).

In some embodiments, the routing status messages include hop count restrictions.

In some embodiments, the proactive node maintains discovered proactive routes by sending additional hello messages and/or routing status messages to the destination node via the gateway nodes of the cluster. The proactive node may receive route responses from the destination node along an updated proactive route and update its own local routing information to include the updated proactive route and/or updated link statuses of the gateway nodes or other proactive nodes within the cluster.

In some embodiments, an on-demand node may receive or "overhear" additional route responses from a destination node to a source node along a proactive route not including the on-demand node as a relay node (but, e.g., forwarded by a nearby relay node). The "opportunistic" on-demand node updates its own local routing information with the additional proactive route.

In some embodiments, the on-demand node transmits a join request to a proactive cluster. If the cluster approves the join request, the on-demand node designates itself as a proactive node and selects a clustering status (e.g., or adopts a default clustering status). The newly proactive node establishes routes to the other proactive nodes of the cluster by transmitting hello messages including an identifier and clustering status of the newly proactive node as well as the group identifier.

A method for hybrid any-cast (unicast, multicast and anycast) routing in a multi-node communication network is also disclosed. In embodiments, the method includes receiving, via a communication node of the network, data packets in transit from a source node to a destination node. The node designates itself as either an on-demand node (e.g., using opportunistic on-demand routing functions) or a proactive node (using proactive routing functions). When the node is a proactive node, the method includes identifying a proactive cluster of other proactive nodes by transmitting hello messages identifying the proactive node and its node clustering status. The method includes adjusting the node identifier to include a group identifier common to all proactive nodes of the cluster. The method includes receiving acknowledgements to the hello messages from the other proactive nodes (e.g., or a subset thereof). The method includes adding any proactive node acknowledgements to a list of node acknowledgements included with retransmissions of the hello messages until no further acknowledgements are received. When the node is an on-demand node, the method includes transmitting the data packets (or a portion thereof) to one or more relay nodes between the source and destination nodes according to packet flooding procedures. The method includes receiving route responses in transit from the destination node to the source node and indicative of a discovered route from the source node to the destination node. The method includes updating local routing information of the on-demand node to include the discovered route. The method includes relaying additional data packets in transit from the source node to the destination node along the discovered route.

In some embodiments, when the node is a proactive node, the method includes designating the node as a clusterhead node. The method includes determining a route from a source node to a destination node by relaying hello messages or routing status messages to the destination node via a gateway node of the cluster. The method includes receiving route responses from the destination node via the gateway node, the route responses indicative of a proactive route to the destination node. The method includes updating local routing information of the clusterhead node to include the proactive route. The method includes transmitting the received data packets to the destination node along the proactive route via the gateway node.

In some embodiments, when the node is a proactive node, the method includes maintaining the proactive route by transmitting additional hello messages or routing status messages to the destination node via the gateway node. The method includes receiving additional route responses from the destination node via the gateway node, the additional route responses indicative of an updated or revised proactive route. The method includes updating the local routing information of the proactive node to include the updated proactive route.

In some embodiments, when the node is an on-demand node, the method includes receiving or "overhearing" additional route responses from a destination node along a proactive route not including the on-demand node (but, e.g., including a relay node proximate to the on-demand node). The method includes updating the local routing information of the on-demand node to include the overheard proactive route.

In some embodiments, when the node is an on-demand node, the method includes transmitting a join request to a proactive node of an existing proactive cluster. The method includes acknowledging acceptance or approval of the join request by the proactive cluster by transitioning the on-demand node to a proactive node. The method includes selecting the clustering status of the newly proactive node (e.g., clusterhead, gateway, ordinary, and/or a default node status). The method includes identifying proactive routes to other proactive nodes of the cluster by transmitting hello messages including a unique identifier and clustering status of the newly proactive node as well as the group identifier common to proactive nodes of the cluster. The method includes receiving routing status messages from the proactive nodes of the cluster. The method includes updating the local routing information of the newly proactive node according to the received routing status messages.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

and FIGS. 5A through 5F are a flow diagrams illustrating a method for hybrid anycast routing in a multi-node communication network according to example embodiments of this disclosure.

DETAILED DESCRIPTION

Figure 1:
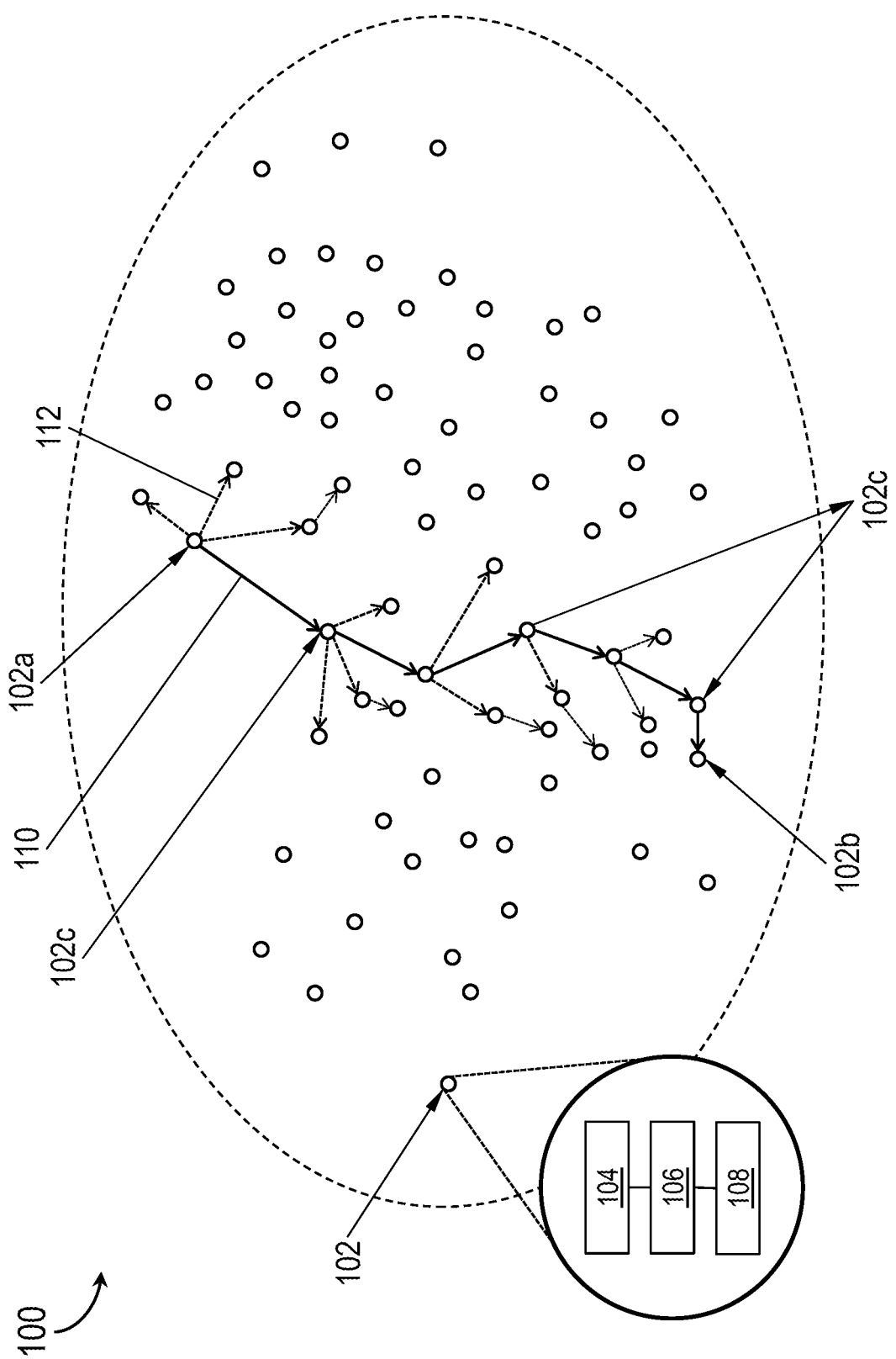
FIG. 1 is a diagrammatic illustration of a multi-node communication network according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a multi-node communication network 100 is disclosed. The multi-node communication network 100 may include communication nodes 102.

In embodiments, the multi-node communication network 100 may include any multi-node communication network known in the art. For example, the multi-node communication network 100 may include a mobile ad-hoc network (MANET) in which each communication node 102 within the multi-node communication network is able to move freely and independently. Similarly, the one or more communication nodes 102 may include any communication node known in the art which may be communicatively coupled. In this regard, the one or more communication nodes 102 may include any communication node known in the art for transmitting/transceiving data packets. For example, the one or more communication nodes 102 may include, but are not limited to, radios, mobile phones, smart phones, tablets, smart watches, laptops, and the like. In embodiments, each communication node 102 of the multi-node communication network 100 may include, but is not limited to, a respective controller 104 (e.g., control processor), memory 106, and communication interface 108.

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the multi-node communication network 100 may determine the shortest route for transmission of a data packet between a source node 102a and a destination node 102b. For example, each communication node 102 of the multi-node communication network 100 may default to opportunistic on-demand routing. The source node 102a may transmit (110) the data packet (e.g., or a portion thereof) to the destination node 102b according to one or more packet flooding schemes or techniques (e.g., flooding to routing (F2R), efficient flooding with passive clustering (EFPC), zero overhead efficient flooding (ZOEF), ad hoc on-demand distance vector (AODV) routing, as disclosed by U.S. patent application Ser. Nos. 16/369,398, 16/537,824, and 16/707, 111 herein incorporated by reference in their entirety). In some embodiments, the source node 102a may transmit hello messages, route request packets, or other specialized topology learning packets instead of the data to be transmitted.

In embodiments, any relay nodes 102c within sufficient transmission range of the source node 102a to receive or "hear" the data packet may relay (112) the data packet. For example, referring also to FIG. 2, packet flooding may continue until the destination node 102b receives the data packet from a relay node 102c, thereby establishing a discovered route 202 from the source node 102a to the destination node 102b. The destination node 102b may store the discovered route 202 in its local routing table and respond to a route request (e.g., route response) to the source node 102a along the discovered route, such that the source node 102a and any relay nodes 102c along the discovered route may also note the discovered route in their local routing tables.

In embodiments, the communication nodes 102 of the multi-node communication network 100 may default to opportunistic on-demand routing in that other proximate or nearby nodes 102d may receive or "overhear" route requests transmitted by the destination node 102b and relayed by nearby relay nodes 102c along the discovered route 202. Accordingly, the nearby nodes 102d may also establish the discovered route 202 to the destination node 102b in their own local routing tables.

Figure 2:
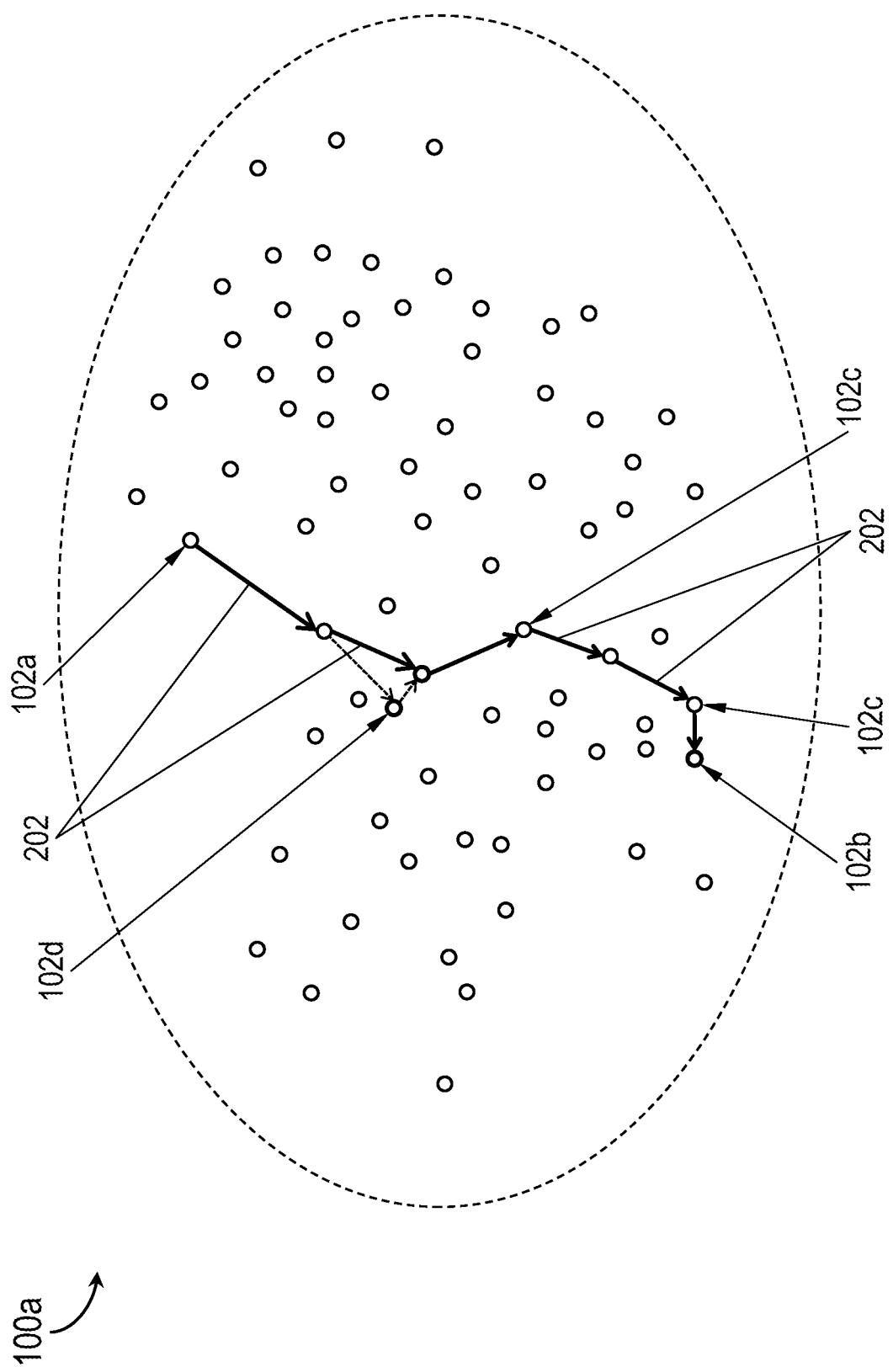
FIG. 2 is a diagrammatic illustration of the multi-node communication network of FIG. 1.
Figure 3:
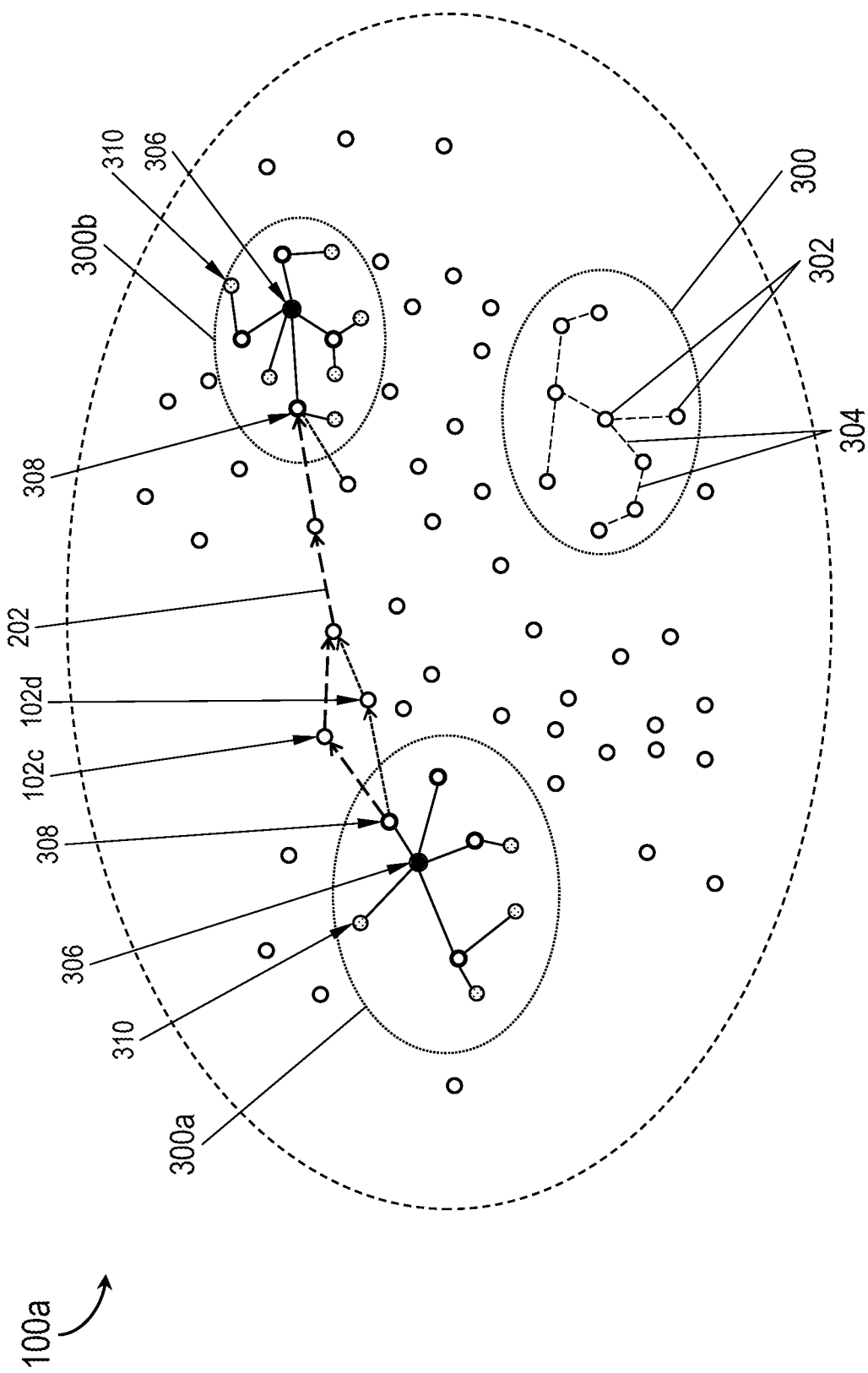
FIG. 3 is a diagrammatic illustration of concurrent proactive and on-demand routing functions within the multi-node communication network of FIG. 1.

Referring now to FIG. 3, the multi-node communication network 100a may be implemented and may function similarly to the multi-node communication network 100 of FIGS. 1 and 2, except that the multi-node communication network 100a may support the concurrent operation of proactive and on-demand routing functionalities.

In embodiments, a cluster 300 of communication nodes may be formed by a group of proactive nodes 302 transitioning from the default opportunistic on-demand state (e.g., as shown by FIGS. 1 and 2) and organizing themselves according to independent dominating set (IDS) based routing proactive routing or other appropriate proactive routing functions (e.g., independent dominating set (IDS) based routing, optimized link status routing (OLSR), as disclosed by U.S. patent application Ser. No. 16/987,671 herein incorporated by reference in its entirety). For example, every communication node 102, 302 of the multi-node communication network 100a may be configured to execute both on-demand routing functions (e.g., route search flooding) and proactive routing functions and for rapid transition between the two paradigms. Network preplanning or CONOPS may provide that the communication nodes 102 may under certain conditions exchange sufficient traffic among each other that the more efficient option would be to operate as a cluster 300 or other like proactive group. The cluster 300 of proactive nodes 302 may form as a result of operator input (e.g., having a preassigned group identifier), or one or more proactive nodes may operate with partial or full autonomy (e.g., via hop count enforced by a critical node initiating proactive routing via link status or topology advertisements).

In embodiments, the cluster 300 of proactive nodes 302 may establish and maintain routes 304 among its member nodes. For example, the cluster 300 may establish (e.g., via an initiating clusterhead node 306 or other critical node) a group identifier common to all member proactive nodes 302, which group identifier may be used by all proactive nodes to control the scope of proactive routing functions (e.g., hello messaging and/or routing status messages (e.g., link status advertisements (LSA), distance vector distributions (DVD), and unique node/clustering status identifiers incorporated therein) in establishing and maintaining routes to communication nodes 102 outside the cluster. Hello messages and/or routing status messages may incorporate hop count restrictions to limit excess message traffic due to packet flooding within, or external to, the clusters 300a-b.

In embodiments, the clusters 300a-b may be implemented and may function similarly to the cluster 300, except that the clusters 300a-b may organize as critical or non-critical nodes according to the applicable proactive routing structure. For example, the proactive nodes 302 of the clusters 300a-b may organize themselves into clusterhead nodes 306, gateway nodes 308, ordinary nodes 310, or according to other node clustering statuses. Each cluster 300a-b may include a single clusterhead node 306 responsible for initiating routing status message (LSA/DVD) flooding and for collecting and maintaining link statuses among other proactive nodes (e.g., gateway nodes 308, ordinary nodes 310) in its cluster. Similarly, the number and distribution of critical nodes (e.g., clusterhead nodes 306, gateway nodes 308) within each cluster 300a-b may vary depending on applicable clustering status transition rules associated with the applicable proactive routing structure.

In embodiments, the gateway nodes 308 may relay data packets to and from the ordinary nodes 310 within each cluster 300a-b. Similarly, the gateway nodes 308 may relay data packets to and from the clusterhead nodes 306 (or, e.g., if the data packets originate from source nodes (102a, FIG. 1) or destination nodes (102b, FIG. 1) outside their respective clusters 300a-b). For example, network traffic between the clusters 300a-b may be relayed between gateway nodes 308 of each cluster, but may continue to be handled on an opportunistic on-demand basis external to the clusters. In embodiments, the gateway nodes 308 of the respective clusters 300a-b (and opportunistic on-demand relay nodes 102c between the two clusters) may implement packet flooding to discover a route (202) between the two gateway nodes 308 of the respective clusters 300a-b. Similarly, any proximate nodes 102d able to receive or overhear the discovered route 202 may add the discovered route to their own local routing tables.

Figure 4A:
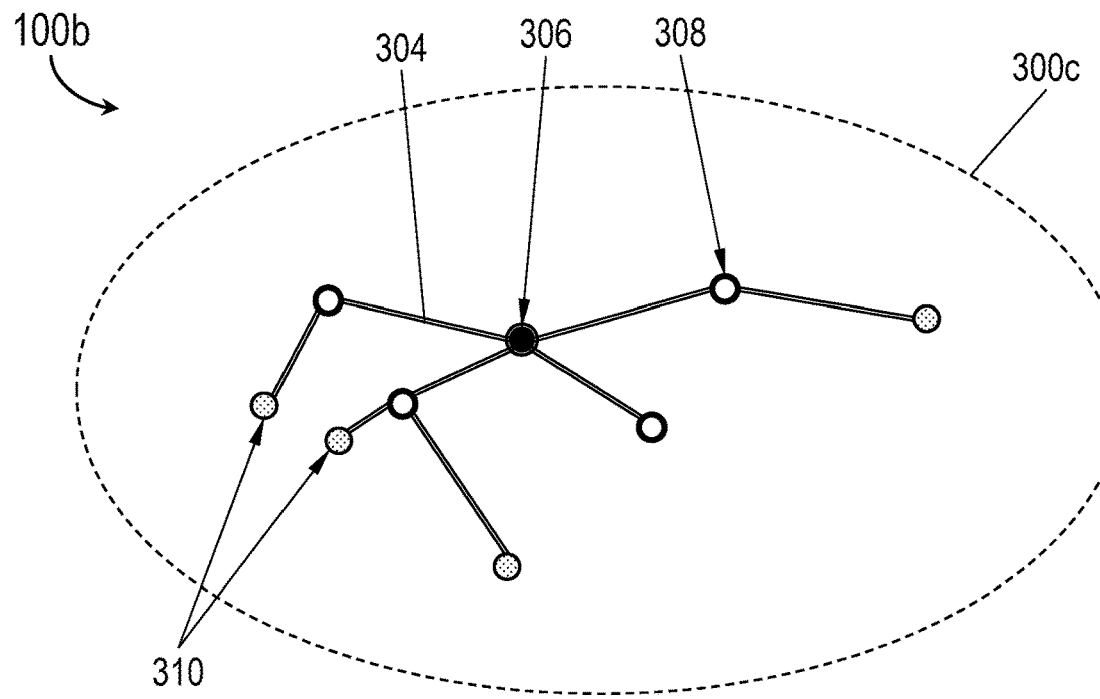
FIGS. 4A and 4B are diagrammatic illustrations of concurrent proactive and on-demand routing functions within the multi-node communications network of FIG. 1.
Figure 4B:
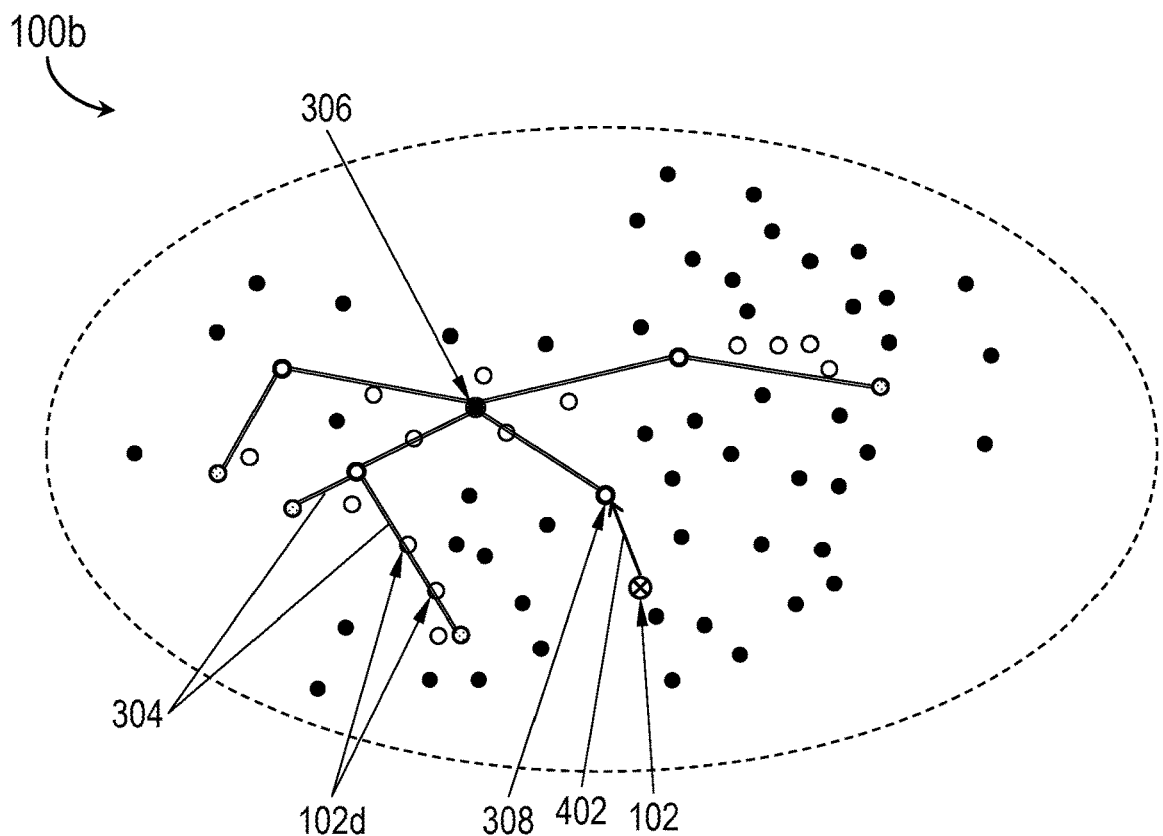

Referring to FIGS. 4A and 4B, the multi-node communication network 100b and cluster 300c may be implemented and may function similarly to the multi-node communication network 100a and clusters 300a-b of FIG. 3, except that the cluster 300c may operate as a cluster of proactive nodes (302, FIG. 2) within the multi-node communication network 100b independent of geographical restrictions. For example, the clusterhead node 306, gateway nodes 308, and ordinary nodes 310 of the cluster 300c may construct and maintain proactive routes among each other without regard to the geographical distribution of either the proactive nodes of the cluster or the (opportunistic on-demand) communication nodes 102 of the multi-node communication network 100b. This may affect the number of proximate or nearby nodes 102 able to opportunistically overhear proactive routes (304) between the clusterhead node 306, gateway nodes 308, and ordinary nodes 310 of the cluster 300c.

In embodiments, communication nodes (102, FIG. 1) implementing on-demand routing (e.g., on a default basis) may request to join an existing cluster 300c. For example, the communication node 102 may transmit a join request 402 (e.g., a flooding packet with a node and/or group/cluster identifier) to a proactive node (e.g., gateway node 308) and, if the join request is approved, the (on-demand) communications node 102 may transition to proactive routing. The newly proactive node (102) may designate a clustering status, adjust its unique node identifier to include a cluster/group identifier, and initiate proactive route discovery by transmitting a hello message to the gateway node 308 for relay to the clusterhead node 306, which may collect updated routing information from the other gateway nodes 308 and ordinary nodes 310 of the cluster 300c (e.g., via flooding through the gateway nodes) and transmit the updated routing information back to the newly proactive node via the gateway node. The newly proactive node 102 may update its local routing information and adjust its clustering status based on the updated routing information received from the cluster 300c. In some embodiments, pre-planning may provide for the communication node 102 joining the cluster 300c at a particular time (e.g., either by join request or by invitation transmitted to the communications node 102 by a proactive node of the cluster) and, at a subsequent time, leaving the cluster and reverting to opportunistic on-demand routing functions.

Figure 5A:
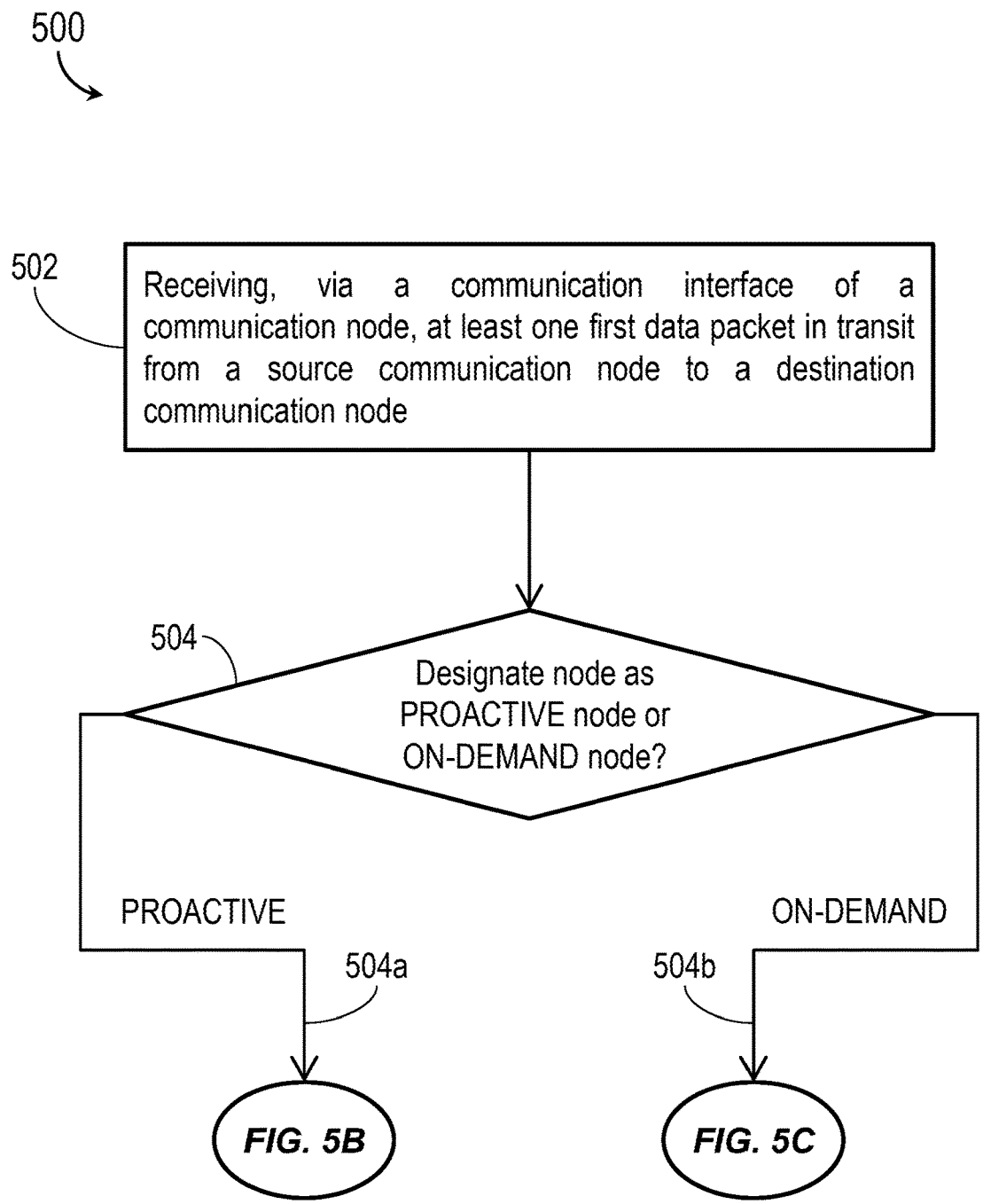

Referring now to FIG. 5A, the method 500 may be implemented by the multi-node communication networks 100, 100a-b and may include the following steps.

At a step 502, a communication node of the multi-node communication network receives, via its communication interface, a data packet in transit from a source node to a destination node.

At a step 504, the communication node designates itself as a proactive node (504a) or an on-demand node (504b). For example, if the communication node defaults to on-demand routing functions, the communications node may retain its on-demand status. Alternatively, the communications node may be one of a group of nodes organizing as a cluster of proactive nodes, or an on-demand node invited to join a pre-existing cluster.

Figure 5B:
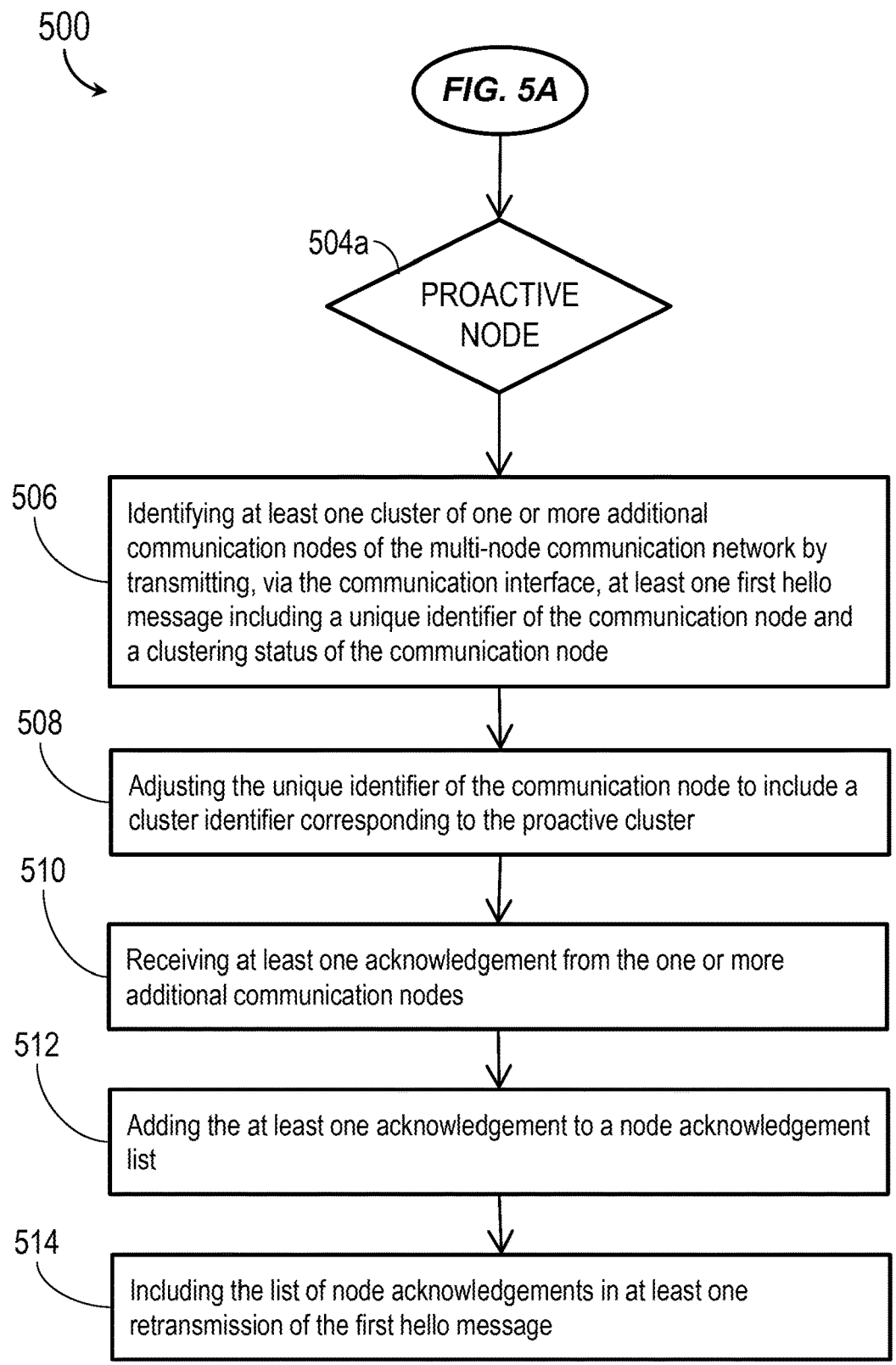

Referring now to FIG. 5B, if the communications node is a proactive node (504a), the method 500 may additionally include the steps 506 through 512. At the step 506, the proactive node identifies a cluster of additional proactive nodes by transmitting, via its communication interface, hello messages including a unique identifier of the communication node and a clustering status of the communication node. In some embodiments, the hello messages may include detailed or complete routing information.

At a step 508, the proactive node adjusts its unique node identifier to include a group identifier for the cluster.

At a step 510, the proactive node receives acknowledgements from one or more proactive nodes of the cluster.

At a step 512, the proactive node adds the received acknowledgements to its list of node acknowledgements.

At the step 514, the proactive node includes the list of node acknowledgements in subsequent retransmissions of the hello message. In some embodiments, the proactive node may iteratively transmit multiple instances of the list of node acknowledgements, each instance updated to reflect the most recent acknowledgements, until no further acknowledgements are received for at least a predetermined time interval.

Referring now to FIG. 5C, the method 500 of FIG. 5C may include the additional steps 516 through 520. At the step 516, the proactive node maintains a route to the destination node by transmitting additional hello messages or routing status messages to the destination node for relay by the gateway nodes of the cluster.

At a step 518, the proactive node receives a subsequent route response from the destination node, and relayed by the gateway nodes, indicating an updated proactive route.

At the step 520, the proactive node updates its routing information to include the updated proactive route.

Figure 5D:
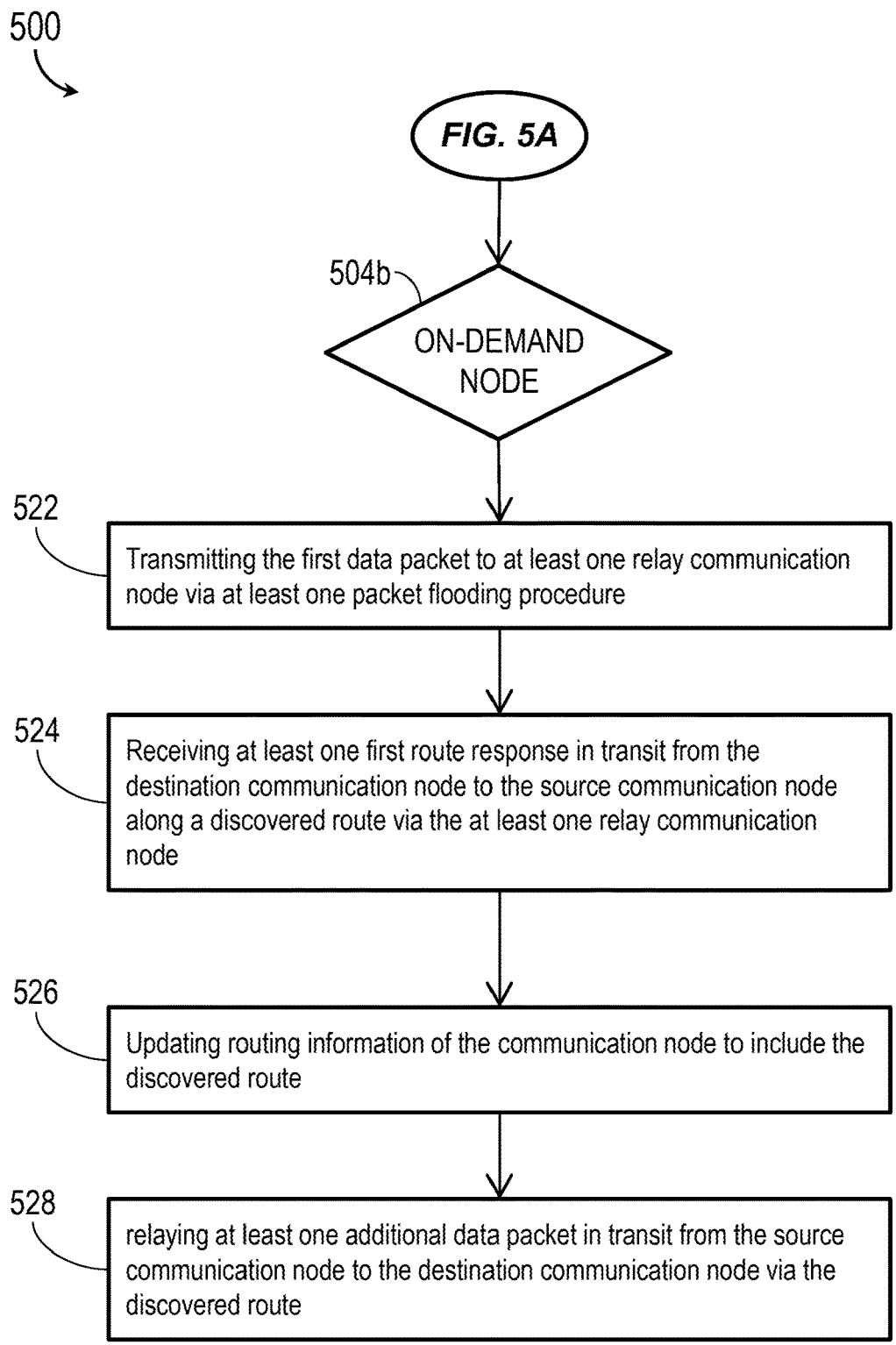

Referring now to FIG. 5D, if the communications node is an on-demand node (504b), the method 500 of FIG. 5A may include the steps 522 through 528. At the step 522, the on-demand node transmits the received data packet (or a portion thereof) to at least one relay node according to one or more packet flooding procedures or schemes.

At a step 524, the on-demand node receives a route response from the destination node, and in transit to the source node, indicative of a discovered route from the source node to the destination node including one or more relay nodes.

At a step 526, the on-demand node updates its routing information to include the discovered route.

At the step 528, the on-demand node transmits additional data packets originating with the source node to the destination node along the discovered route.

Figure 5E:
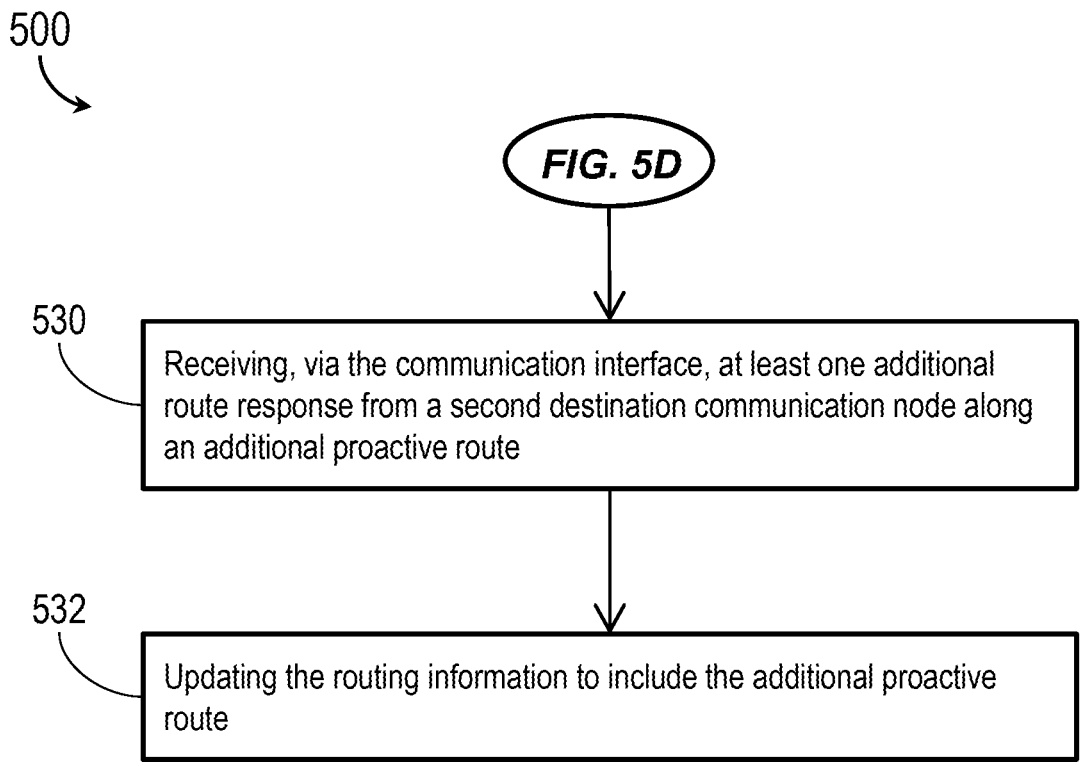

Referring now to FIG. 5E, the method 500 of FIG. 5D may include the additional steps 530 and 532. At the step 530, the on-demand node receives (e.g., "overhears") an additional route response from an additional destination node along a new proactive route.

At the step 532, the on-demand node updates its local routing information to include the new proactive route.

Figure 5F:
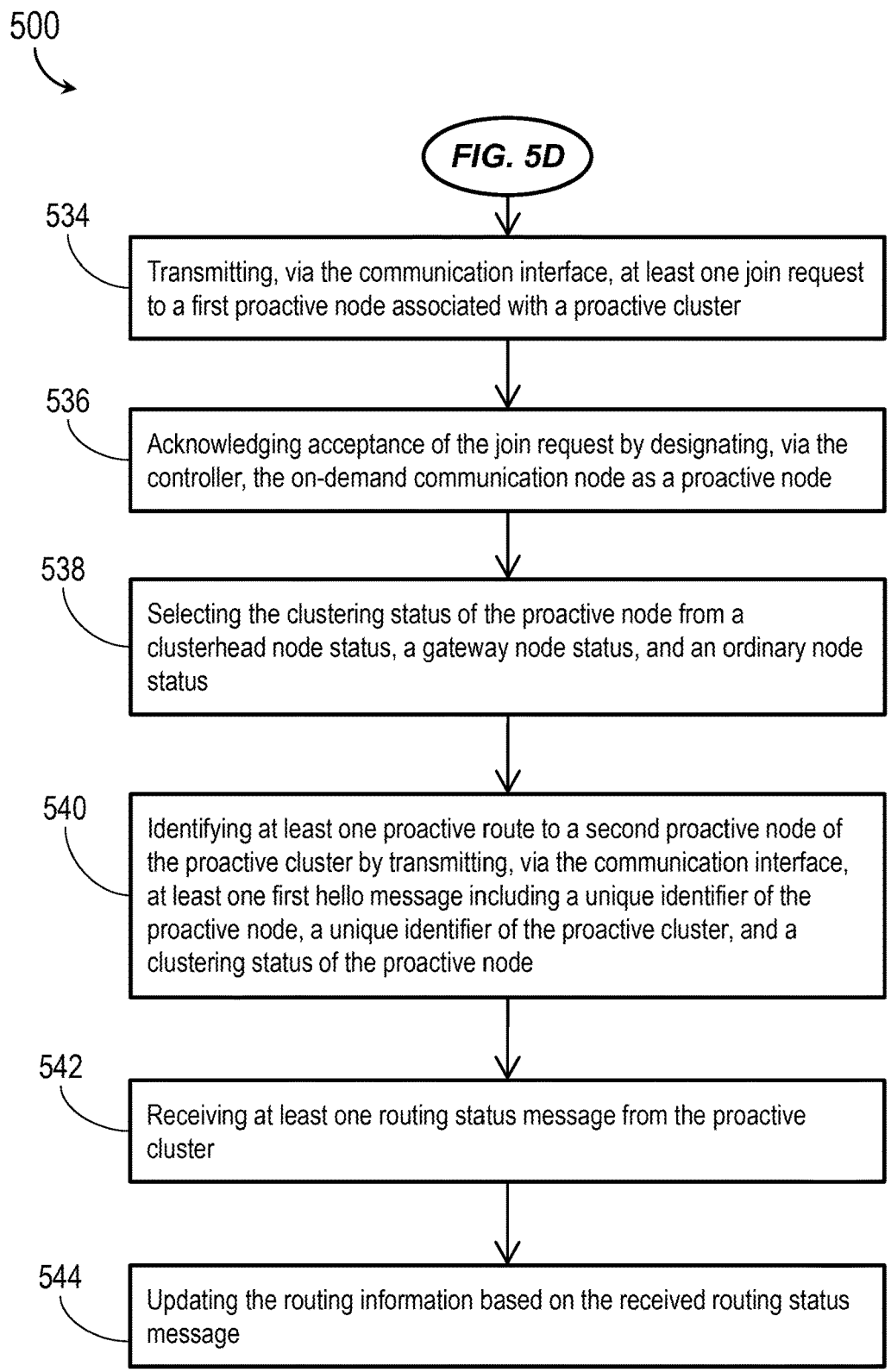

Referring to FIG. 5F, the method 500 of FIG. 5D may include the additional steps 534 through 544. At the step 534, the on-demand node transmits a join request (e.g., a flooding packet with a node and cluster identifier) to an existing proactive node associated with a cluster of proactive nodes.

At a step 536, the on-demand node acknowledges an accepted join request by designating the on-demand node as a proactive node and a member of the cluster.

At a step 538, the newly proactive node designates a node clustering status (e.g., clusterhead, gateway, ordinary). For example, the newly proactive node may default to gateway node status.

At a step 540, the newly proactive node discovers proactive route information for its cluster (e.g., identities of other proactive nodes within the cluster, and route information for the other proactive nodes) by transmitting hello messages to the existing proactive node (e.g., which may be relayed and/or flooded within the cluster by the existing proactive node to collect updated routing information).

At a step 542, the newly proactive node receives a routing status message (e.g., a link status advertisement (LSA) or distance vector distribution (DVD) transmitted by the existing proactive node) including updated routing, node identity, and clustering status information for member nodes of the proactive cluster.

At the step 544, the newly proactive node updates its local routing table based on the group routing information received from the cluster.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A communication node of a multi-node communication network, the communication node comprising:
   a communication interface;
   and
   at least one controller communicatively coupled to the communication interface, the controller configured to:
   receive, via the communication interface, at least one first data packet in transit from a source communication node to a destination communication node;
   designate the communication node as a proactive communication node by:
   identifying at least one proactive cluster of one or more additional communication nodes of the multi-node communication network, the proactive cluster including at least one gateway node having a gateway node status, by transmitting, via the communication interface, at least one hello message including a unique identifier of the communication node and a clustering status of the communication node;
   designating the clustering status of the communication node as a clusterhead status;
   adjusting the unique identifier of the communication node to include a cluster identifier corresponding to the proactive cluster;
   receiving at least one acknowledgement from the one or more additional communication nodes;
   adding the at least one acknowledgement to a list of node acknowledgements;
   and
   including the list of node acknowledgements in at least one retransmission of the hello message;
   determine a route from the source communication node to the destination communication node by relaying, via the communication interface, at least one routing status message to the destination communication node via the at least one gateway node;
   receive, via the communication interface, at least one first route response from the destination communication node along a proactive route via the at least one gateway node;
   update the routing information to include the proactive route;
   and
   transmit the at least one first data packet to the destination node along the proactive route via the at least one gateway node;
   or
   designate the communication node as an on-demand communication node by:
   transmitting the first data packet to at least one relay communication node via at least one packet flooding procedure;
   receiving at least one second route response in transit from the destination communication node to the source communication node along a discovered route via the at least one relay communication node;
   updating routing information of the communication node to include the discovered route;
   and
   relaying at least one additional data packet in transit from the source communication node to the destination communication node via the discovered route.

2. The communication node of claim 1, wherein the at least one hello message is an adaptive hello message not including a local neighbor list.

3. The communication node of claim 1, wherein the at least one routing status message is selected from a link status advertisement (LSA) or a distance vector distribution (DVD).

4. The communication node of claim 1, wherein the at least one routing status message includes a hop count restriction.

5. The communication node of claim 1, wherein the hello message is a first hello message, the routing status message is a first routing status message, and the controller is configured to maintain the at least one proactive route by:
   relaying, via the communication interface, at least one of a second hello message and a second routing status message to the destination communication node via the at least one gateway node;
   receiving, via the communication interface, at least one additional route response from the destination communication node along an updated proactive route via the at least one gateway node;
   and
   updating the routing information to include one or more of the updated proactive route and an updated link status of the one or more additional communication nodes.

6. The communication node of claim 1, wherein the destination communication node is a first destination communication node, and the on-demand communication node is configured to:
   receive, via the communication interface, at least one additional route response from a second destination communication node along an additional proactive route;
   and
   update the routing information to include the additional proactive route.

7. The communication node of claim 1, wherein the on-demand communication node is configured to:
- transmit, via the communication interface, at least one join request to a first proactive node associated with a proactive duster;
- acknowledge acceptance of the join request by designating, via the controller, the on-demand communication node as a second proactive node;
- select the clustering status of the second proactive node from a clusterhead node status, a gateway node status, and an ordinary node status;
and
- identify at least one proactive route to a third proactive node of the proactive duster by transmitting, via the communication interface, at least one first hello message including a unique identifier of the second proactive node, a unique identifier of the proactive duster, and the selected clustering status of the second proactive node.

8. A method for hybrid any-cast routing in a multi-node communication network, the method comprising:
- receiving, via a communication interface of a communication node, at least one data packet in transit from a source communication node to a destination communication node;
- designating, via a controller of the communication node, the communication node as one of a proactive node and an on-demand node;
- when the communication node is a proactive node:
  - identifying at least one proactive cluster of one or more additional communication nodes of the multi-node communication network, the proactive cluster including at least one gateway node having a gateway node status, by transmitting, via the communication interface, at least one hello message including a unique identifier of the communication node and a clustering status of the communication node;
  - designating, via the controller, the clustering status of the communication node as a clusterhead node status;
  - adjusting the unique identifier of the communication node to include a cluster identifier corresponding to the proactive cluster;
  - receiving at least one acknowledgement from the one or more additional communication nodes;
  - adding the at least one acknowledgement to a node acknowledgement list;
  - including the list of node acknowledgements in at least one retransmission of the hello message;
  - determining a route from the source communication node to the destination communication node by relaying, via the communication interface, at least one of the hello message and a first routing status message to the destination communication node via the at least one gateway node;
  - receiving, via the communication interface, at least one first route response from the destination communication node along a proactive route via the at least one gateway node;
  - updating the routing information to include the proactive route;
  and
  - transmitting the at least one data packet to the destination node along the proactive route via the at least one gateway node; and
- when the communication node is an on-demand node:
  - transmitting the data packet to at least one relay communication node via at least one packet flooding procedure;
  - receiving at least one second route response in transit from the destination communication node to the source communication node along a discovered route via the at least one relay communication node;
  - updating routing information of the communication node to include the discovered route;
  and
  - relaying at least one additional data packet in transit from the source communication node to the destination communication node via the discovered route.

9. The method of claim 8, wherein the hello message is a first hello message and the routing status message is a first routing status message, further comprising:
- when the communication node is a proactive node, maintaining the at least one proactive route by:
  - relaying, via the communication interface, at least one of a second hello message and a second routing status message to the destination communication node via the at least one gateway node;
  - receiving, via the communication interface, at least one additional route response from the destination communication node along an updated proactive route via the at least one gateway node;
  and
  - updating the routing information to include the updated proactive route.

10. The method of claim 8, further comprising:
- when the communication node is an on-demand node:
  - receiving, via the communication interface, at least one additional route response from a second destination communication node along an additional proactive route;
  and
  - updating the routing information to include the additional proactive route.

11. The method of claim 8, further comprising:
- when the communication node is an on-demand node:
  - transmitting, via the communication interface, at least one join request to a first proactive node associated with a proactive cluster;
  - acknowledging acceptance of the join request by designating, via the controller, the on-demand communication node as a second proactive node;
  - selecting the clustering status of the second proactive node from a clusterhead node status, a gateway node status, and an ordinary node status;
  - identifying at least one proactive route to a third proactive node of the proactive cluster by transmitting, via the communication interface, at least one first hello message including a unique identifier of the second proactive node, a unique identifier of the proactive duster, and the selected clustering status of the second proactive node;
  - receiving at least one additional routing status message from the proactive duster;
  and
  - updating the routing information based on the received additional routing status message.

12. The method of claim 8, wherein the at least one hello message is an adaptive hello message not including a local neighbor list.

13. The method of claim 8, wherein the at least one routing status message is selected from a link status advertisement (LSA) or a distance vector distribution (DVD).

14. The method of claim 8, wherein the at least one routing status message includes a hop count restriction.

\* \* \* \* \*